US007547392B2

(12) United States Patent
Gordon (10) Patent No.: US 7,547,392 B2
(45) Date of Patent: Jun. 16, 2009

(54) WASTEWATER TREATMENT VESSEL (75) Inventor: Andrew W. Gordon, Boca Raton, FL (US)

(73) Assignee: Water Standard Company LLC, Boca Raton, FL (US)

( * ) Notice: Subject to any disclaimer, the term of this patent is extended or adjusted under 35 U.S.C. 154(b) by 0 days.

(21) Appl. No.: 12/350,833

(22) Filed: Jan. 8, 2009

(65) Prior Publication Data

US 2009/0114603 A1 May 7, 2009

Related U.S. Application Data

(60) Division of application No. 11/924,749, filed on Oct. 26, 2007, now abandoned, which is a continuation of application No. 11/508,661, filed on Aug. 23, 2006, now Pat. No. 7,306,724, which is a continuation-in-part of application No. 11/114,721, filed on Apr. 25, 2005, now Pat. No. 7,153,423.

(60) Provisional application No. 60/564,921, filed on Apr. 23, 2004.

(51) Int. Cl.
*B01D 21/24* (2006.01)
(52) U.S. Cl. .................................. 210/242.1

(58) Field of Classification Search .............. 210/242.1, 210/242.2
See application file for complete search history.

(56) References Cited

U.S. PATENT DOCUMENTS 5,032,289 A * 7/1991 Martineau .................... 210/747
2005/0082214 A1 * 4/2005 Max ........................... 210/220

* cited by examiner

*Primary Examiner*—Chester T. Barry
(74) *Attorney, Agent, or Firm*—Osha • Liang LLP (57) ABSTRACT

A vessel configured to float on a body of seawater has a wastewater treatment system having a wastewater intake port for intaking wastewater onto the vessel, a wastewater treatment component for treating the wastewater to produce treated wastewater and sludge, and a treated wastewater conduit for transporting the treated wastewater away from the wastewater treatment component, a desalination system has a seawater intake for intaking seawater from the body of seawater onto the vessel, a desalination component for desalinating the seawater to produce concentrate and desalinated water, and a desalinated water discharge port for transferring the desalinated water from the vessel, a mixing system has a mixing tank for mixing the treated wastewater from the wastewater treatment system with the concentrate from the desalination system, and a wastewater discharge system for discharging the treated wastewater and concentrate mixture into the body of seawater.

12 Claims, 5 Drawing Sheets

WASTEWATER TREATMENT VESSEL

CROSS-REFERENCE OF RELATED APPLICATION

This application is a divisional application of U.S. patent application Ser. No. 11/924,749, now abandoned, which claims the priority from U.S. patent application Ser. No. 11/508,661, filed Aug. 23, 2006 (now U.S. Pat. No. 7,306,724); U.S. patent application Ser. No. 11/114,721, filed Apr. 25, 2005 (now U.S. Pat. No. 7,153,423); and U.S. provisional patent application Ser. No. 60/564,921 filed Apr. 23, 2004. Each of the foregoing applications is incorporated in its entirety herein by reference.

FIELD OF THE INVENTION

The invention relates to systems and methods for treating wastewater (WW) using an apparatus positioned offshore.

BACKGROUND

Most municipalities presently employ land-based WW treatment facilities downstream of their sewage collection systems to process raw WW into a more innocuous form. The end products of conventional WW treatment systems are treated WW and sludge. Depending on its level of treatment and resultant quality, the treated WW can reused or disposed of in a body of seawater (SW) adjacent to the WW treatment plant. Sludge is typically dumped at an offsite location, but is sometimes processed for use as fertilizer. The creation and disposal of these end products as well as the general operation of a WW treatment plant can have undesirable effects. For example, land-based WW treatment plants often occupy expensive waterfront real estate, present an eyesore to the surrounding community, and emit unpleasant odors. Worse, the cumulative discharge charge of end products created by the WW treatment process can damage the environment.

SUMMARY

The invention is based on the development of environmentally friendly systems and methods of processing large volumes of untreated WW (e.g., raw sewage from a municipal sewer system) into treated WW and sludge end products. By positioning one or more components of the WW operation offshore, the need for expensive shore-side land is reduced and any unpleasant odors are minimized. The invention also provides several innovations to reduce the impact of WW treatment on the marine environment including the pre-dilution of one or more WW treatment end products prior to discharge into a body of SW, plankton avoidance equipment, and having intake and discharge at different depths. The diluent in the pre-dilution step can be water from the body of SW or concentrate produced from a desalination operation (e.g., such that the resulting mixture has a salt concentration close to that of the body of SW). The WW treatment systems and methods of the invention can be used in combination with desalination and power generation components.

Accordingly, the invention features a method of treating wastewater on at least one apparatus positioned at a location on the surface of a body of seawater. This method includes the steps of intaking wastewater into the at least one apparatus; treating the wastewater taken into the at least one apparatus to yield end products including treated wastewater and sludge; diluting at least one of the end products with seawater to yield an at least one diluted end product; and discharging the at least one diluted end product into the body of seawater. The at least one of the end products can include treated wastewater or sludge. The step of diluting the at least one of the end products with seawater occurs on the apparatus, for example. The at least one diluted end product can have a salinity level substantially equal to the salinity level of the seawater at the area where the at least one diluted end product is discharged. The at least one diluted end product can have a temperature substantially equal to the temperature of the seawater at the area where the at least one diluted end product is discharged. The at least one diluted end product can have a salinity level and temperature substantially equal to the salinity level and temperature of the body of seawater at the area where the at least one diluted end product is discharged. The step of diluting the at least one end product with seawater can be performed in a mixing tank including a space in which the at least one end product can be mixed with seawater to form the at least one diluted end product, an inlet for introducing the at least one end product into the space, an inlet for introducing seawater into the space, and an outlet for discharging the at least one diluted end product from the space, the outlet being in fluid communication with a discharge port.

In the method, at least about 75 million liters of wastewater are treated per day. The method can further include transferring wastewater to be treated from a land-based site to the apparatus and transferring one of the end products (e.g., treated wastewater, sludge) from the apparatus to land. The at least one apparatus includes a single sea-going vessel or a platform. The at least one apparatus can also include at least two devices in fluid communication (e.g., sea-going vessel and a platform). The wastewater taken into the at least one apparatus can be raw sewage, e.g., raw sewage that has been subjected to a step to remove from the wastewater undissolved solids and/or undissolved liquids. The step of treating the wastewater taken into the at least one apparatus to yield the end products can include removing constituents of the wastewater by a sedimentation step and a membrane filtration step. The at least one apparatus can include a nuisance reduction system for reducing at least one of sound or odor emission.

Treating the wastewater taken into the at least one apparatus to yield end products including treated wastewater and sludge can further yield at least one combustible gas. The method can further include the step of capturing the at least one combustible gas, e.g., methane, and converting it into electricity. The at least one apparatus can include an electricity producing means, e.g., a gas turbine-powered generator, for converting the at least one combustible gas into electricity. The electricity can power one or more of the following steps: intaking wastewater into the at least one apparatus, treating the wastewater taken into the at least one apparatus to yield end products including treated wastewater and sludge, diluting at least one of the end products with seawater to yield an at least one diluted end product, and discharging the at least one diluted end product into the body of seawater. The at least one apparatus can further include a means for transferring the electricity from the at least one apparatus to a land-based distribution system. In the method, at least a first portion of the electricity can be transferred to the land-based distribution system, and at least a second portion of the electricity can power one or more of the following steps: intaking wastewater into the at least one apparatus, treating the wastewater taken into the at least one apparatus to yield end products including treated wastewater and sludge, diluting at least one of the end products with seawater to yield an at least one diluted end product, and discharging the at least one diluted end product into the body of seawater.

Another method performed on at least one apparatus positioned at a location on the surface of a body of seawater within the invention includes the steps of: intaking wastewater and seawater into the at least one apparatus; treating the wastewater taken into the at least one apparatus to yield end products including treated wastewater and sludge; desalinating the seawater on the at least one apparatus to yield desalinated water and a concentrate; mixing the treated wastewater with the concentrate to make a treated wastewater-concentrate mixture; and discharging the treated wastewater-concentrate mixture into the body of seawater. The treated wastewater-concentrate mixture can have a salinity level substantially equal to the salinity level of the seawater at the area where the treated wastewater-concentrate mixture is discharged. The treated wastewater-concentrate mixture can have a temperature substantially equal to the temperature of the seawater at the area where the treated wastewater-concentrate mixture is discharged. The treated wastewater-concentrate mixture can have a salinity level and temperature substantially equal to the salinity level and temperature of the body of seawater at the area where the treated wastewater-concentrate mixture is discharged.

The at least one apparatus can include at least a first device such as a sea-going vessel and a platform and a second device such as a sea-going vessel and a platform. In this method, the first and second devices can be in fluid communication. The step of treating the wastewater taken into the at least one apparatus to yield end products including treated wastewater and sludge can be performed on the first device and the step of desalinating the seawater can be performed on the second device. The step of mixing the treated wastewater with the concentrate to make a treated wastewater-concentrate mixture can be performed in a mixing tank including a space in which the treated wastewater and concentrate can be mixed, an inlet for introducing the treated wastewater into the space, an inlet for introducing the concentrate into the space, and an outlet for discharging the treated wastewater-concentrate mixture from the space, the outlet being in fluid communication with a discharge port. Treating the wastewater taken into the at least one apparatus to yield end products including treated wastewater and sludge can further yield at least one combustible gas, e.g., methane.

The method can further include the step of capturing the at least one combustible gas and converting it into electricity. In this method, the at least one apparatus can include an electricity producing means, a gas turbine-powered generator, for converting the at least one combustible gas into electricity. The electricity can power one or more of the following steps: intaking wastewater into the at least one apparatus, treating the wastewater taken into the at least one apparatus to yield end products including treated wastewater and sludge, diluting at least one of the end products with seawater to yield an at least one diluted end product, and discharging the at least one diluted end product into the body of seawater. The at least one apparatus can further include a means for transferring the electricity from the at least one apparatus to a land-based distribution system. In this method, at least a first portion of the electricity can be transferred to the land-based distribution system, and at least a second portion of the electricity can power one or more of the following steps: intaking wastewater into the at least one apparatus, treating the wastewater taken into the at least one apparatus to yield end products including treated wastewater and sludge, diluting at least one of the end products with seawater to yield an at least one diluted end product, and discharging the at least one diluted end product into the body of seawater.

In another aspect, the invention features a system for treating wastewater on at least one apparatus positioned at a location on the surface of a body of seawater. This system includes: at least one apparatus being positioned at a location on the surface of a body of seawater; a wastewater treatment system installed on the at least one apparatus, the wastewater treatment system capable of removing organic material from wastewater to yield end products including treated wastewater and a sludge; a seawater intake system installed on the at least one apparatus and including a device for taking up seawater from the body of seawater; a mixing system for mixing at least one of the end products with seawater to yield an at least one diluted end product, the mixing system being installed on the at least one apparatus in communication with the wastewater treatment system and including a space in which the at least one of the end products can be mixed with seawater to form the at least one diluted end product, an inlet for introducing the at least one of the end products into the space, an inlet for introducing seawater into the space, and an outlet for discharging the at least one diluted end product from the space; and a discharge system for discharging the at least one diluted end product from the at least one apparatus, the discharge system being installed on the at least one apparatus and including at least one discharge port. The wastewater treatment system is capable of processing at least about 75 million liters of wastewater per day. The system can further include a land-based site, e.g., a sewage collection facility, in fluid communication with the at least one apparatus. The device for taking up seawater can include at least one water intake positioned in the body of seawater at a first depth. The at least one discharge port can be positioned at a site not at the first depth, e.g., the at least one discharge port can be positioned at a site deeper than the first depth or at a site more shallow than the first depth. The at least one discharge port can be positioned in or below a thermocline and the first depth can be above the thermocline. The at least one discharge port can be positioned above a thermocline and the first depth can be in or below the thermocline. The water intake can be movable such that the water intake system can intake water from various depths to reduce the intake of plankton. The apparatus can include instrumentation and sensors for detecting the presence of and depth of thermoclines in the body of seawater, and instrumentation and sensors for detecting the presence of and depth of plankton in the body of seawater.

In the system, the wastewater treatment system capable of removing organic material from wastewater to yield end products including treated wastewater and a sludge is further capable of yielding at least one combustible gas, e.g., methane. The system can further include at least one energy producing means, e.g., a gas turbine-powered generator, installed on the at least one apparatus for converting the at least one combustible gas into electricity. The electricity can power one or more of the following: the at least one apparatus, the wastewater treatment system, the seawater intake system, the mixing system, and the discharge system. The system can further include a means for transferring the electricity from the at least one apparatus to a land-based distribution system. At least a first portion of the electricity can be transferred to the land-based distribution system, and at least a second portion of the electricity can power one or more of the following: the at least one apparatus, the wastewater treatment system, the seawater intake system, the mixing system, and the discharge system.

Also within the invention is a method of treating wastewater on at least one apparatus positioned at a location on the surface of a body of seawater. This method includes the steps of intaking wastewater from a land-based site into the at least one apparatus; treating the wastewater taken into the at least one apparatus to yield end products including treated wastewater and a sludge, and transferring the treated wastewater and the sludge to land, wherein none of the wastewater, the treated wastewater, or the sludge is discharged into the body of seawater. In this method, the treated wastewater can be potable.

Unless otherwise defined, all technical terms used herein have the same meaning as commonly understood by one of ordinary skill in the art to which this invention belongs.

By the phrase "treated WW" is meant WW that has been subjected to at least one WW treatment step.

As used herein, the terms "land-based," "on land," "shore-based," and "on shore" refer to systems and structures that are primarily or entirely disposed on land or shore.

By "offshore" systems or apparatuses is meant those that are primarily or entirely disposed in or on the surface of a body of SW such as an ocean, lake, river, bay, or sea.

As used herein, the term "thermocline" refers to a temperature gradient in a layer of sea water, in which the temperature decrease with depth is greater than that of the overlying and underlying water.

The terms "seawater" or "SW" are used in the broad sense to encompass water from any large body of SW such as an ocean, lake, river, bay, or sea regardless of whether the water is salt water, fresh water, or brackish water. Similarly, "body of seawater" or "body of SW" include oceans, lakes, rivers, bays, or seas regardless of whether the body of SW is salt water, fresh water, or brackish water As used herein, the term "substantially equal" does not refer to a comparison of quantitative measurements, but rather that the impact on the affected marine life or ecosystem is qualitatively negligible.

Although apparatuses, methods and materials similar or equivalent to those described herein can be used in the practice or testing of the present invention, suitable apparatuses, methods and materials are described below. All publications, patent applications, patents, and other references mentioned herein are incorporated by reference in their entirety. In the case of conflict, the present specification, including definitions will control. In addition, the particular embodiments discussed below are illustrative only and not intended to be limiting.

DETAILED DESCRIPTION

The invention encompasses WW treatment methods and systems for processing a large volume of WW such as at least about 75 million liters (e.g., greater than about 50 million, 100 million; 200 million, 300 million, 400 million, 500 million, or 600 million or more) of WW per day. The methods and systems of the invention utilize an apparatus (or the combination of 2, 3, 4, 5, 6, 7, 8, 9, 10 or more apparatuses) positioned on the surface of a body of SW. Any suitable apparatus positionable on the surface of a body of SW and capable of housing a WW treatment system might be used. The apparatus can be self-propelled, non-self propelled, manned, or unmanned, but is preferably a sea-going vessel because of mobility and ease of construction (i.e., the vessel can be built at any suitable shipyard in an industrialized country and moved from the shipyard to the place of use). Examples of a suitable sea-going vessel include a barge; a floating platform secured to the floor of the body of SW; a bulk carrier vessel (e.g., single or double hull bulk carrier vessels); a sea-going vessel designed to transport cargo such as petroleum, grain, or iron ore that has been retrofitted for housing the components and systems for treating WW described herein; and a newly constructed, sea-going vessel specifically designed for housing the components and systems for treating WW described herein.

An appropriate sea-going vessel for use in the invention is a single- or double-hull vessel that has, e.g., a dead weight tonnage (dwt) of between about 10,000 to 500,000; 30,000 and 50,000; 65,000 and 80,000; about 120,000; about 250,000 and 300,000; or more than 300,000. The preferred dwt will depend on the particular design of a given system (e.g., the volume of WW to be treated per period of time), but should be sufficient to maintain the minimum draft required to keep the vessel afloat, and/or match the desired treatment capacity of the system on the vessel. As described herein, an apparatus can be moored or anchored to the floor of the body of SW or to a structure such as a dock. To accommodate any new or emerging technologies for treating WW, the apparatus is preferably arranged to accept modular upgrades, i.e., various components can be replaced/upgraded separately apart from other components.

Various functional components can be installed on the apparatus including WW treatment components capable of removing organic material from WW to yield end products including treated WW and sludge; a SW intake system including a device for taking up SW from the body of SW; a mixing system for mixing sludge and/or treated WW with SW to yield a diluted end product; and a discharge system including a discharge port for discharging the at least one diluted end product from the apparatus.

The WW treatment system generally includes a land-based site such as a sewage collection facility that collects WW from residential (household), commercial, industrial, government, and/or agricultural sources. WW from the land-based site is transferred to the apparatus for treatment, e.g., by a pipeline or shuttle ship. The WW treatment system can include one or more (e.g., 2, 3, 4, 5, 6, 7, 8, 9, 10, or more) WW treatment components specifically selected to handle the composition of WW from a particular source. WW treatment components suitable for use in the invention are any capable of performing at least one step in a WW treatment protocol, e.g., removing one or more non-water substances such as solids, oils, waxes, organic matter, and dissolved solids from the WW. Treatments and devices used in land-based WW treatment are well known in the art. See, e.g., *Wastewater Treatment Plants: Planning, Design, and Operation, Second Edition*, Syed R. Qasim, Ed., CRC Press, 1998; and *Design of Municipal Wastewater Treatment Plants* (Asce Manual and Reports on Engineering Practice), 4th edition, American Society of Civil Engineers, 1998. These and other components can be used in the systems, apparatuses, and methods described herein with slight or no modifications. Any combination of WW treatments, systems, or methods suitable for treating WW can be used on an apparatus as described herein.

In some embodiments, WW treatment is performed on a single apparatus having thereon all WW treatment components required to sufficiently treat the WW for its intended purpose. In other embodiments, however, the WW treatment steps are performed on at least two (e.g., 3, 4, 5, 6, 7, 8, 9, 10 or more) apparatuses each having at least one (e.g., 2, 3, 4, 5 or more) different WW treatment. For example, a first apparatus can include preliminary WW treatment steps such as course screening and grit removal, and a second apparatus can include WW treatment steps such as membrane-based WW treatments (e.g., cloth media filtration, reverse osmosis). In the latter example, the WW treated on the first apparatus is transported (e.g., by a pipeline or shuttle ship) to the second apparatus for additional treatment.

In the invention, WW might also be subjected to one or more preliminary treatments on land before being transferred to an apparatus for further treatment. Preliminary treatments can include removing large objects or impurities such as sticks, rags, large food particles, sand, and gravel from WW. A series of grates, screens, or like devices can be used for preliminary treatment. As the WW passes through the grates/screens, the large objects/impurities are caught, while the remainder of the WW flows through for possible further processing. Another example of a preliminary treatment device is a grit chamber where sand, gravel, and other rock-like materials are removed.

In a typical system, after the WW has been subjected to one or more preliminary treatments on land, it is transferred to the apparatus positioned in the body of SW where it is directed to one or more additional WW treatments. For example, a WW treatment step that often follows preliminary treatment involves a clarification/settling tank where the solids are settled out (often referred to as primary treatment) and digested by microorganisms in the presence of oxygen (aerobic digestion) or in the absence of oxygen (anaerobic digestion). In some embodiments, the clarification tank is a component of a sequencing batch reactor or bioreactor which provides for the settling of solids, as well as microorganism-mediated removal of organic matter from the WW (e.g., Sequencing Batch Reactors such as the AquaMB Process™ marketed by Aqua-Aerobic Systems, Inc., Rockford, Ill., and ZeeWeed® membrane bioreactor marketed by Zenon, Oakville, Ontario, Canada; anaerobic digestion systems marketed by US Filter, Warrendale, Pa.). Although any suitable microorganism-mediated treatment of WW can be used in systems, apparatuses and methods described herein, anaerobic digestion systems may be preferred over aerobic digestion systems because they generally have reduced operating horsepower requirements, do not require aeration, and yield less sludge.

After the WW is subjected to one or more clarification/settling tanks, the WW can then be subjected to a membrane-based treatment such as cloth media filtration, in which bulk solids are separated from the WW stream. An example of a cloth media filter that may be used in systems of the invention is the AquaDisk® filter marketed by Aqua-Aerobic Systems, Inc. (Rockford, Ill.). In a typical system of the invention, a plurality of AquaDisk® filters are housed within a steel (or other metal) tank or basin, one disk in front of another. WW may be further treated by filtration (e.g. using a series of filters having decreasing pore sizes that are capable of removing particles having a diameter greater than 1, 0.1, 0.01, or 0.001 microns; using microfiltration and/or ultrafiltration membranes) any membrane-based filtration that removes solids), reverse osmosis, chlorination, UV irradiation, mineralization, pH balancing, evaporation vapor compression, electrodialysis, multiple effect distillation, electrodionisation or other methods (i.e., polishing, tertiary, quaternary, or advanced treatment). In applications where chlorinated treated WW is to be discharged into a body of SW, a chlorine-neutralizing chemical can be added to prior to discharge.

Other WW treatment processes that might be used in the invention are any physical, chemical, or biological means to improve the quality of the treated WW. For example, chemicals can be added to the treated WW to help settle out or strip out nutrients such as nitrogen, phosphorous might be removed from treated WW using a coagulant, and ammonia might be removed by air stripping. Granular media filtration might be used to remove suspended solids that have not been removed through other treatment processes. Granular activated carbon can be used to remove organic compounds. Ion exchange resins can be used to remove some organics or other materials. Cavitation generated by ultrasound as well as hydrodynamic cavitation can be used to treat WW.

In place of or in addition to reverse osmosis, however, WW can be purified by a variety of other treatment processes including nanofiltration, molecular sieves, and ultrasonic treatment. Nanofiltration techniques are used for removing dissolved organics and inorganics, have been used in water purification and reuse applications (see, e.g., Holt et al., Science 312:1003-1004, 2006; U.S. Pat. No. 6,787,037), and nanofiltration membranes are commercially available (e.g., NTR 729HF membrane marketed by Nitto Denko Corp, Japan). The use of molecular sieves in industrial applications such as WW treatment is well known, see e.g., D. M. Ruthven in Principles of Adsorption and Adsorption Processes, John Wiley and Sons, New York, 1984; Phase IIB Topical Report, U.S. Department of Energy, National Energy Technology Laboratory, Pittsburgh, Pa., "Surface-altered zeolites as permeable barriers for in situ treatment of contaminated groundwater," 2002; Environ. Sci. Technol. 33:4326-4330, 1999; and U.S. Pat. No. 6,863,826. Molecular sieves are commercially available from a number of companies, including, e.g., ZeoponiX, Inc. (Boulder, Colo.).

To minimize harm to the marine environment caused by discharge of a WW treatment end product, the WW treatment apparatus can include a SW intake system for taking up SW from the body of SW on which the apparatus is positioned, a mixing system for mixing at least one of the end products (sludge and/or treated WW) with SW to yield an at least one diluted end product, and a discharge system for discharging the at least one diluted end product. Any suitable device for taking up SW from a body of SW might be used for the SW intake system. In general, the SW intake system includes an intake port positionable in the body of SW, a conduit for transferring SW from the intake port to the mixing system, and one or more pumps and/or valves for intaking the SW and directing it to the mixing system. In an embodiment in which the apparatus is a sea-going vessel, the SW intake can include a pipe that extends from the hull of the vessel into the body of SW. In other embodiments, the SW intake of the SW intake system can include one or more apertures (e.g., one or more sea chests) in the hull of the vessel below the water line.

In those embodiments where treated WW is being diluted and then discharged into the body of SW on the surface of which the apparatus is positioned, the SW intake can be positioned in the body of SW at a depth different than the depth at which the diluted, treated WW is discharged so that the treated WW that has been diluted and discharged is not taken up by the SW intake. Preferably the intake depth and discharge depth are separated by a thermocline to further reduce intake of discharge.

Systems for treating WW as described herein can be operable to intake SW into the SW intake system at various depths to reduce intake of plankton. For example, if the apparatus is a sea-going vessel having a dwt of over 100,000, the draught is usually at least 10 meters. On such a sea-going vessel, a sea chest located on the lower most region of the hull on the vessel can intake SW below 10 meters to reduce plankton intake. In another embodiment, the SW intake can be movable so that it can be placed at a depth which minimizes the intake of plankton. In some embodiments, the system for treating WW including the sea-going vessel is operable to allow an operator of the sea-going vessel to choose between using a sea chest or a SW intake member to intake SW into the mixing system. An operator may choose to use a sea chest or a SW intake member to intake SW based upon the location and depth of thermoclines in SW surrounding the vessel and/or based on the amount of plankton at any particular depth. To assist in plankton/thermocline detection, the WW treatment apparatus of the invention can be equipped with instrumentation and sensors to allow the operator to detect the presence of and depth of thermoclines and/or plankton populations in the surrounding body of SW. The mixing system on the apparatus of the invention can take the form of any suitable device capable of mixing at least one of the end products (treated WW, sludge) with SW from the body of SW on which the WW treatment apparatus is positioned. Such a system is operable to dilute and/or change the temperature of the end product before returning it to the body of SW. Preferably, the diluted end product has a salinity level and/or temperature equal to or substantially equal to that of the SW at the area where it is discharged. For example, the salinity of the diluted end product is between about 150-50% (e.g., 151, 140, 130, 120, 110, 100, 90, 80, 70, 60, 50, 49%) of the seawater at the area where the diluted end product is discharged, and the temperature of the diluted end product is between about 20° C. greater (e.g., 22° C., 20° C., 18° C., 16° C., 14° C., 12° C., 10° C., 8° C., 6° C., 4° C., 2° C., 1° C. greater) and 20° C. less than (e.g., 22° C., 20° C., 18° C., 16° C., 14° C., 12° C., 10° C., 8° C., 6° C., 4° C., 2° C., 1° C. less than) the temperature of the seawater at the area where the diluted end product is discharged.

The mixing system can include a mixing tank having a chamber or space in which a WW treatment end product is mixed with SW from the body of SW to form a diluted end product, an inlet for introducing the at least one end product into the space, an inlet for introducing SW from the body of SW into the space, and an outlet for discharging the diluted end product from the space. The space or chamber of the mixing tank can include a device for enhancing the mixing of end product with SW from the body of SW. As an example, a series of baffles and a mixing barrier having a plurality of apertures might be included in the space. The size, shape, location and number of apertures are selected to optimize mixing of the end product with the SW from the body of SW. The apertures induce turbulence in fluids flowing through the mixing barrier. The mixing barrier extends from one side of the mixture tank to the opposing side of the mixing tank. Adjacent baffles are coupled to opposing sides of the mixing tank. The baffles are arranged in a staggered relationship such that a portion of each baffle overlaps with an adjacent baffle. The fluid passing though the mixing barrier must follow a convoluted route before reaching the discharge system for discharging the at least one diluted end product from the apparatus. Other devices for enhancing mixing that may be used in the space include high speed paddle mixers and static mixers.

The WW treatment system on the apparatus might also include other devices for regulating the temperature of an end product to be discharged, e.g., to change the temperature of an end product so that it is the same as or substantially equal to the temperature of the SW at the area where it is discharged. As an example, the device might take the form of a heat exchange system including a heat exchanger and a cooling system.

After treatment and/or dilution, an end product is discharged from the apparatus via a discharge system. The discharge system can take the form of any suitable device capable of transferring the end product from the apparatus to the body of SW in which the apparatus is positioned. Typically, the discharge system includes at least one discharge port positioned in or above the SW surrounding the apparatus. In embodiments where the apparatus is a sea-going vessel, one or more discharge ports are typically disposed in the hull of the vessel through which the diluted end product is discharged into the SW surrounding the vessel. The discharge port(s) may be disposed in the hull of the vessel such that the discharge port(s) is physically located below or above the water line of the vessel. A plurality of discharge ports can be disposed at intervals along the vessel, allowing the discharge to be discharged over a substantial portion of the vessel's length. A plurality of discharge ports may be mounted on dispersion devices that enable the discharge ports to move in a full hemi-sphere range. The dispersion devices may include a universal joint, a swivel, a gimble, a ball and socket, or other similar devices known to one skilled in the art. Through the oscillation or motion of the plurality of discharge ports, the diluted end product should be more evenly dispersed into the surrounding SW. The discharge system may further include a pump to increase the water pressure of the diluted end product prior to being discharged through the discharge port(s).

The discharge system for discharging an end product can further include a member extending down from the hull of the vessel with a plurality of discharge ports disposed on the member. Depending on various factors such as water depth, water temperature, water currents, and the surrounding ecosystem, the member may extend to the depth or depths that optimize the mixing of the diluted end product with the SW at the area where the at least one diluted end product is discharged. In such a system, the member can be lowered from and retracted to the vessel by mechanical means, such as, for example, a hydraulic assembly. Alternatively, other suitable means can be used to lower and retract the member, including those used in conventional maritime drilling operations. In another embodiment, the member can have sufficient mass and/or density that the member can be lowered from the vessel to a desired depth without mechanical assistance. Such a member is generally retracted to the vessel by mechanical means.

Because an apparatus as described herein may be positioned above or near a thermocline in some cases, discharge ports can be disposed within or below a thermocline region relative to the SW intake of the SW intake system. For example, wherein the discharge system includes a plurality of discharge ports and the SW intake includes a SW intake member, the member extends into or below a thermocline region and the discharge ports are disposed above the thermocline region. As another example, wherein the SW intake of a SW intake system includes a sea chest, and the discharge system includes a member having discharge ports disposed thereon, the discharge ports are located on the member such that each discharge port is disposed within or below a thermocline region relative to the sea chest. Such a configuration may reduce or eliminate uptake of discharged end product(s) into the SW intake system.

In addition to treated WW, another end product of the WW treatment process is sludge. In general, the sludge generated by the WW treatment process is treated on the apparatus before either being diluted and discharged from the apparatus into the body of SW or transferred to land. The apparatus can therefore include at least one (e.g., 1, 2, 3, 4, 5 or more) sludge treatment component that processes the sludge. As an example, the sludge component can include a digestion tank wherein aerobic and/or anaerobic digestion by bacteria is used to decompose organic components in the sludge. To kill disease-causing organisms, the sludge may also be treated with microbe killing agents such as caustic chemicals or ultraviolet light. Ultrasound treatment might also be used to decrease sludge quantity (volume and mass) and increase the biogas yield (which can be used as fuel to generate power as described below). See, e.g., Kulkami et al., Resonance, December, p. 64-74, 2000; and U.S. Pat. Nos. 6,780,306, 5,611,993, 6,773,597, and 6,578,780.

The sludge resulting from WW treatment can be transferred to a land-based facility for further processing, disposal, or use (e.g., as agricultural fertilizer). For example, a tugboat drawn barge can be used as a transfer vessel to transfer treated sludge from an apparatus positioned in a body of SW to a land-based sludge disposal/distribution facility. Alternatively, if the apparatus is located adjacent to a dock, the treated sludge can be transferred from the apparatus to a land-based facility via a conveyor belt disposed on the dock and/or a vehicle such as a truck. To facilitate handling, the mass of sludge can be reduced by dewatering, e.g., using a belt filter press to remove water from sludge and produce a non-liquid cake.

If the treated sludge is being discharged into the body of SW on the surface of which the apparatus is positioned, it is preferably diluted with SW from the body of SW before being discharged. The sludge can be mixed with SW from the body of SW as described above for mixing an at least one end product with SW from the body of SW on the surface of which the apparatus is positioned and discharged into this body of SW via the discharge system for discharging the at least one end product from the apparatus.

In addition to those features described above, apparatuses of the invention might further include a number of other features. For example, an apparatus as described herein can include one or more noise, odor, and/or vibration reduction devices in communication with any moving mechanical device aboard the apparatus. Such mechanical devices include, but are not limited to, a power source, a high pressure pump, a transfer pump, and a SW intake pump. The noise reduction devices may include any isolation, suspension, or shock absorbers known to one skilled in the art. The noise reduction devices also include any noise abatement technique known to one skilled in the art. Noise reduction devices onboard an offshore apparatus that is a sea-going vessel may include a hull made of composite material or machines with precision manufacturing such that the rattle associated with a mechanical device is reduced when operating. Noise reduction devices can reduce the vibrations or noise transmitted through the hull of the sea-going vessel and thereby reduce any disturbance or interference with normal aquatic or marine life. For example, the noise reduction devices can reduce interference with the acoustic communication between whales. Further, the noise reduction devices can reduce the hearing hazard to the crew of the vessel. Vibration reduction devices can also be included on an offshore apparatus. For example, such devices can be used to dampen vibrations associated with the movement of fluids (e.g., WW, SW, treated water, desalinated water) through piping in the vessel such as encasement on a pipe's exterior. The encasement of a pipe can reduce velocity noise in piping generated by the movement of water.

The WW treatment components described above might be used in conjunction with other systems including those for desalinating water and producing power. For example, the WW apparatus positioned on a body of SW might also include a desalination system for producing desalinated water and a concentrate (brine). Suitable desalination methods and systems are described in U.S. patent application Ser. No. 10/734,050 and U.S. Pat. No. 7,081,205. An advantage of combining SW desalination with WW treatment is that the concentrate resulting from the desalination process can be mixed with the treated WW resulting from the WW process (e.g., in a mixing tank on the apparatus) such that the resulting mixture has a salinity close to that of the body of SW in which the apparatus is positioned. Detrimental effects of separately discharging treated WW and concentrate on the marine environment are thus reduced.

The WW apparatus positioned on a body of SW might also include a power generation system for producing power that can be used to run other components of the WW treatment system or for use by other sea-based or land-based power-using systems. Fuel for the power generation system can be supplied to the apparatus by a pipeline or shuttle ship. Examples of suitable fuels include biofuels (e.g., fuels such as ethanol or methanol that are produced at least in part from biomass such as plants, straw, or biomass waste streams); petroleum-based fuels such as diesel fuel, jet fuel, kerosene, and gasoline; gases such as propane or natural gas; liquefied coal products, etc. Additionally or alternatively, the combustible gases produced in the WW treatment process can serve as fuel for the power generation system. The apparatus can include a tank for storing the fuel.

The power produced by the power generation system can be used to power one or more functions of the apparatus (e.g., propulsion device, control systems, WW treatment components, desalination components, etc.), or transferred to another sea-based or land-based site for use or distribution. The transfer of power can be accomplished by any suitable means known in the art for transferring power. As an example, the power generation system can produce electrical power which is transferred to an electricity-using device or electricity storage device (e.g., a battery) by an electrical conductor (e.g., metal cable).

Although any suitable power producing means can be used in the systems and methods described herein, gas turbines, or gas turbine generators, may be preferred. Numerous different gas turbines outfitted or modifiable to produce electricity that are suitable for use in the invention are known and commercially available. For example, GE (Atlanta, Ga.) markets a Frame 9FB engine as well as the LM2500 Gas Turbine, Rolls Royce (Houston, Tex.) markets a 501 series gas turbine, Siemens (Siemens AG, Orlando, Fla.) markets an SGT-500 gas turbine, and Centrax (Newton Abbot, England) markets the 501 series (e.g., 501-KB3, 501-KJ35, 501-KN5, 501-KH5, 501-KB7, and 501-KN7) of gas turbine-powered generators.

EXAMPLES

FIGS. 1-5 illustrate examples of various representative embodiments of the invention. Each of the components of the described systems might be substituted with any other component that is suitable for the function described. In addition, the various systems described might be rearranged in any suitable fashion.

Example 1

Figure 1:
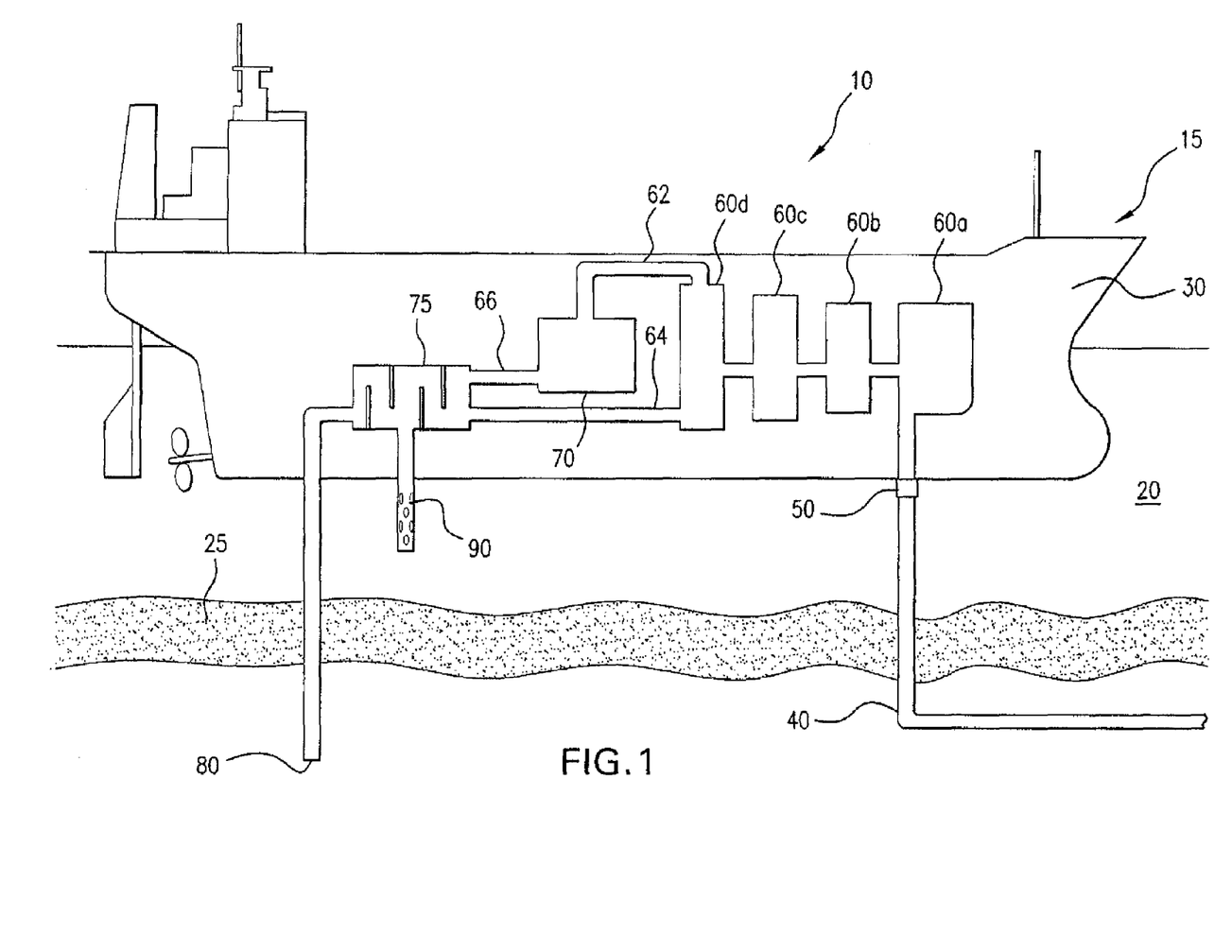
FIG. 1 is a side view of an apparatus for treating WW.

Referring now to FIG. 1, a system 10 for treating WW includes a sea-going vessel 15 positioned on the surface of a body of SW 20 and a WW intake pipeline 40. The vessel 15 includes a hull 30; WW treatment components 60a, 60b, 60c, and 60d; a treated WW conduit 64; a sludge treatment component 70; sludge conduits 62, 66; a SW intake 80, a mixing tank 75, and a discharge port 90. The WW intake pipeline 40 is shown in fluid communication with an intake port 50 positioned on the bottom of hull 30. In operation, WW from a land-based sewer facility is transferred to the vessel 15 via the WW intake pipeline 40 to intake port 50. The WW is then directed to one or more of WW treatment components 60a-60d where it is subjected to one or more WW treatment processes that result in the production of treated WW and sludge as end products.

Although the treated WW could be removed from the vessel 15 and transferred to land for reuse, in the embodiment shown in FIG. 1, treated WW is discharged from the vessel 15 into the body of SW 20. After processing in the WW treatment components 60a-60d, the treated WW is transferred through conduit 64 into the mixing tank 75 which includes a space in which the treated WW can be diluted with SW from the body of SW 20, an inlet for introducing the treated WW into the space, an inlet for introducing SW from the body of SW 20 into the space, and an outlet for discharging the diluted treated WW. For taking up SW from the body of SW 20 into the mixing tank 75, the vessel 15 includes a SW intake 80 that fluidly connects the body of SW 20 to the mixing tank 75. In the embodiment shown in FIG. 1, the SW intake 80 is shown as a pipe having an aperture on its distal end. After the treated WW is diluted with SW from the body of SW 20 in the mixing tank 75, the mixture is discharged from the vessel 15 through the discharge port 90 which is shown in FIG. 1 as extending from the hull 30 into the body of SW 20.

Similarly to the handling of the treated WW, the sludge resulting from the WW treatment process is also diluted with SW prior to discharge into the body of SW 20. The sludge produced after treatment in the WW treatment components 60a-60d is transferred to the sludge treatment component 70 via the sludge conduit 62. In the sludge treatment component 70, the sludge undergoes at least one sludge treatment step (e.g., bacterial digestion, ultraviolet light, dewatering) to yield treated sludge. The treated sludge is then transferred to the mixing tank 75 via the sludge conduit 62 where it is diluted with SW and then discharged into the body of SW 20 via discharge port 90 into the body of SW 20.

In FIG. 1, a thermocline 25 is shown in the body of SW 20. The SW intake 80 is positioned in the body of SW at a depth below the thermocline 25, while the discharge port 90 is positioned at a depth above the thermocline 25. In this configuration, the thermocline acts as a barrier that separates the SW intake 80 from the discharge port 90 such that SW to be used for diluting a treated WW end product is taken up from water below the thermocline 25 and the diluted treated end product is discharged into water above the thermocline. This separation reduces the uptake of treated diluted WW end product by the SW intake 80 and thereby increases the efficiency of the system 10.

Example 2

Figure 2:
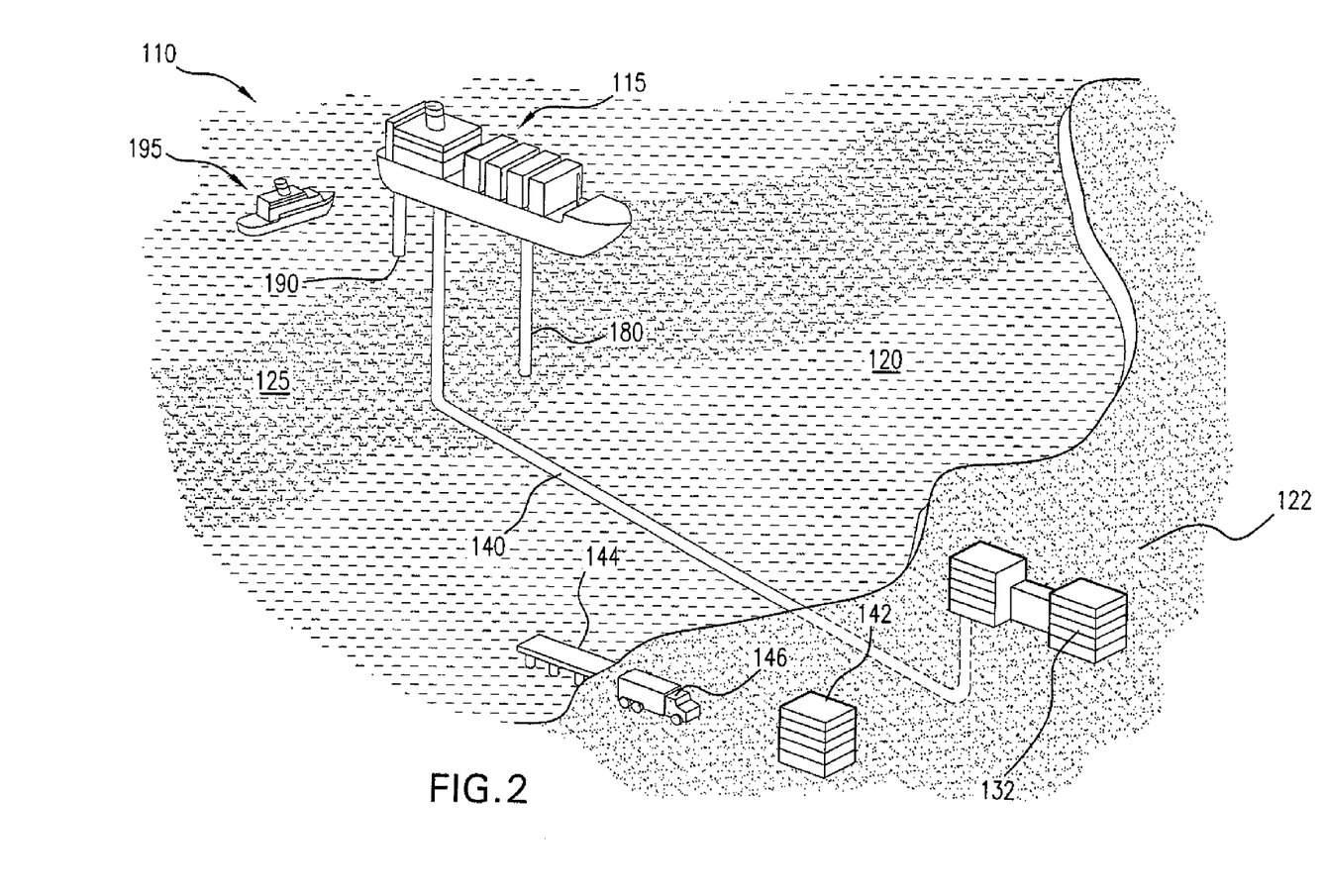
FIG. 2 is a schematic view of an apparatus for treating WW and a transfer vessel.

In another embodiment of the invention, referring now to FIG. 2, a WW treatment system 110 includes a sea-going vessel 115 situated on the surface of a body of SW 20 and having disposed thereon WW treatment components for processing WW into treated WW and sludge, a SW intake 80, and a discharge port 90; a WW intake pipeline 50 for transferring WW from a sewer system 132 located on a parcel of land 122 to the vessel 115; a transfer vessel 195 for transferring sludge produced by the WW treatment components from the vessel 115 to a land-based sludge collection/distribution facility 142 that includes a dock 144 and a sludge transport vehicle 146. As in the embodiment shown in FIG. 1, the sea-going vessel 115 includes components (e.g., a SW intake 80, a discharge port 190, and a mixing tank) for diluting the treated WW produced by the WW treatment components prior to discharge into the body of SW 20.

In this embodiment, treated sludge is transferred to a land-based site for use (e.g., as fertilizer) or disposal, rather than being discharged into the body of SW 20. The produced sludge is transported from the sea-going vessel 115 to the dock 144 via the transfer vessel 195. From the dock 144, the sludge is moved to the land-based sludge collection/distribution facility 142 for storage and/or further processing. The sludge transport vehicle 146 can be used to transport the sludge from the facility 142 to another destination.

Example 3

Figure 3:
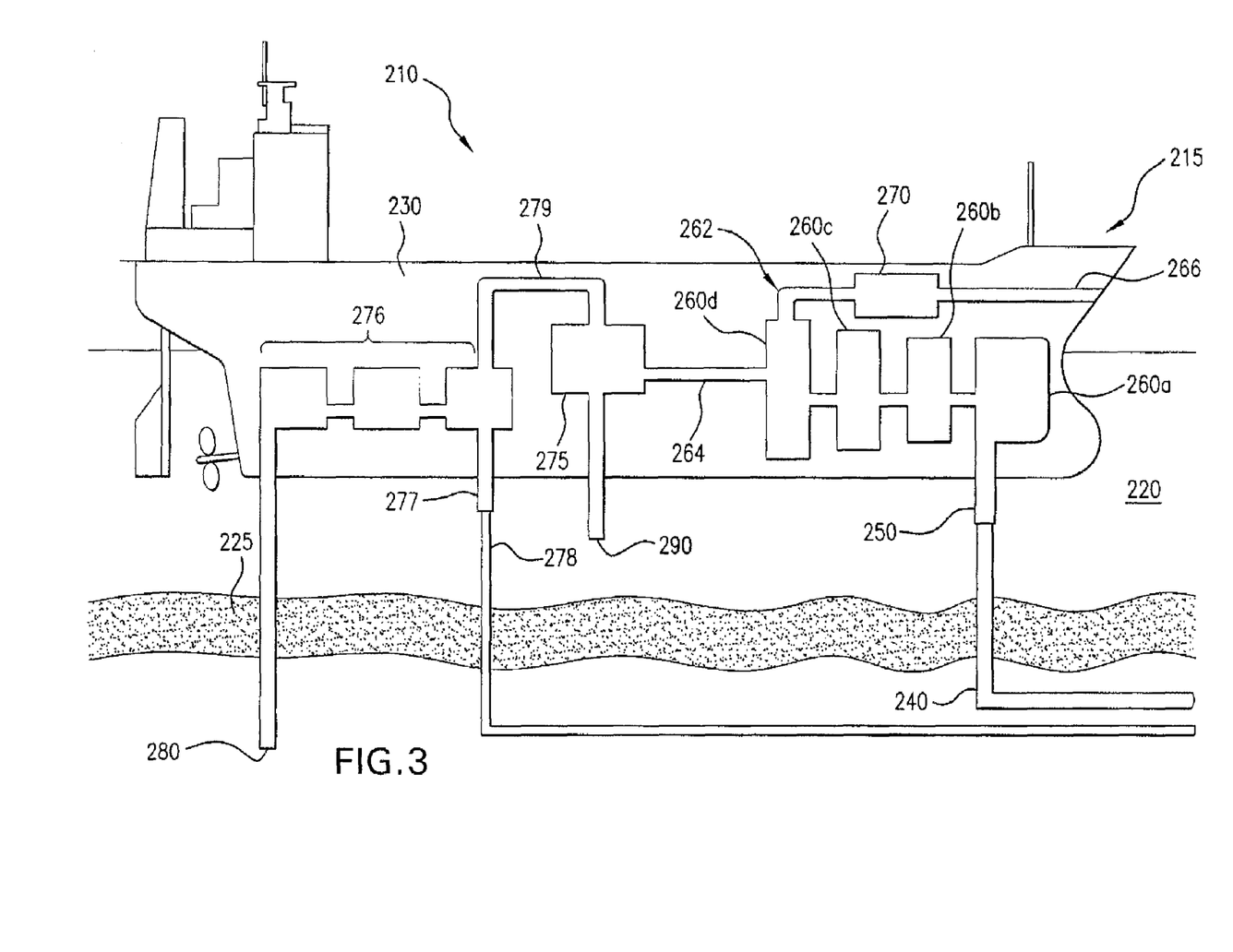
FIG. 3 is a side view of an apparatus for treating WW and desalinating SW.

Referring now to FIG. 3, a WW treatment system 210 includes a sea-going vessel 215 positioned on the surface of a body of SW 20 and a WW intake pipeline 240. The vessel 215 includes a hull 230; a WW treatment system, a desalination system, and a mixing system for mixing the concentrate produced by the desalination system with the treated WW produced by the WW treatment system. Similar to the embodiment of FIG. 1, the WW treatment system includes a wastewater intake port 250 for intaking WW onto the vessel 215 from a WW pipeline 240; WW treatment components 260a, 260b, 260c, and 260d; a treated WW conduit 264 for transporting treated WW away from the WW treatment components 260a, 260b, 260c, and 260d; a sludge treatment component 270; and a sludge transfer conduit 266. The desalination system of the vessel 215 includes a SW intake 280, a desalination component 276, a desalinated water discharge port 277; and a concentrate conduit 279. Both the WW treatment system and the desalination system are in fluid communication with a concentrate-treated WW mixing system that include a mixing tank 275 and a discharge port 290.

In operation, WW from a land-based sewer facility is transferred to the vessel 215 via the WW intake pipeline 240 to intake port 250. The WW is then directed to one or more of WW treatment components 260a-260d where it is subjected to one or more WW treatment processes that result in the production of treated WW and sludge as end products. The treated WW is conveyed to the mixing tank 275 via treated WW conduit 264. The sludge is transported to the sludge treatment component 270 for further processing and then to the sludge transfer conduit 266 where it may be offloaded from the vessel 215.

In the desalination system, SW to be desalinated is taken up into the vessel 215 by the SW intake 280 and then transferred to the desalination component 276 where it is desalinated, yielding desalinated water and concentrate as end products. The desalinated water is sent from the desalination component 276 through the desalinated water discharge port 277 into the desalinated water pipeline 278 where it can be transported to a land-based desalinated water distribution center. The concentrate produced by the desalination process is transferred from the desalination system 276 to the mixing tank 275 via the concentrate conduit 279.

In the mixing tank 275, the concentrate produced from the desalination process is mixed with the treated WW resulting from the WW treatment process. This mixture is then discharged from the vessel 215 by the discharge port 290 into the body of SW 20. By mixing appropriate amounts of concentrate and treated WW, the resulting mixture can have a salt concentration equal to or substantially equal to that of the body of SW 20 into which it is being discharged.

Example 4

Figure 4:
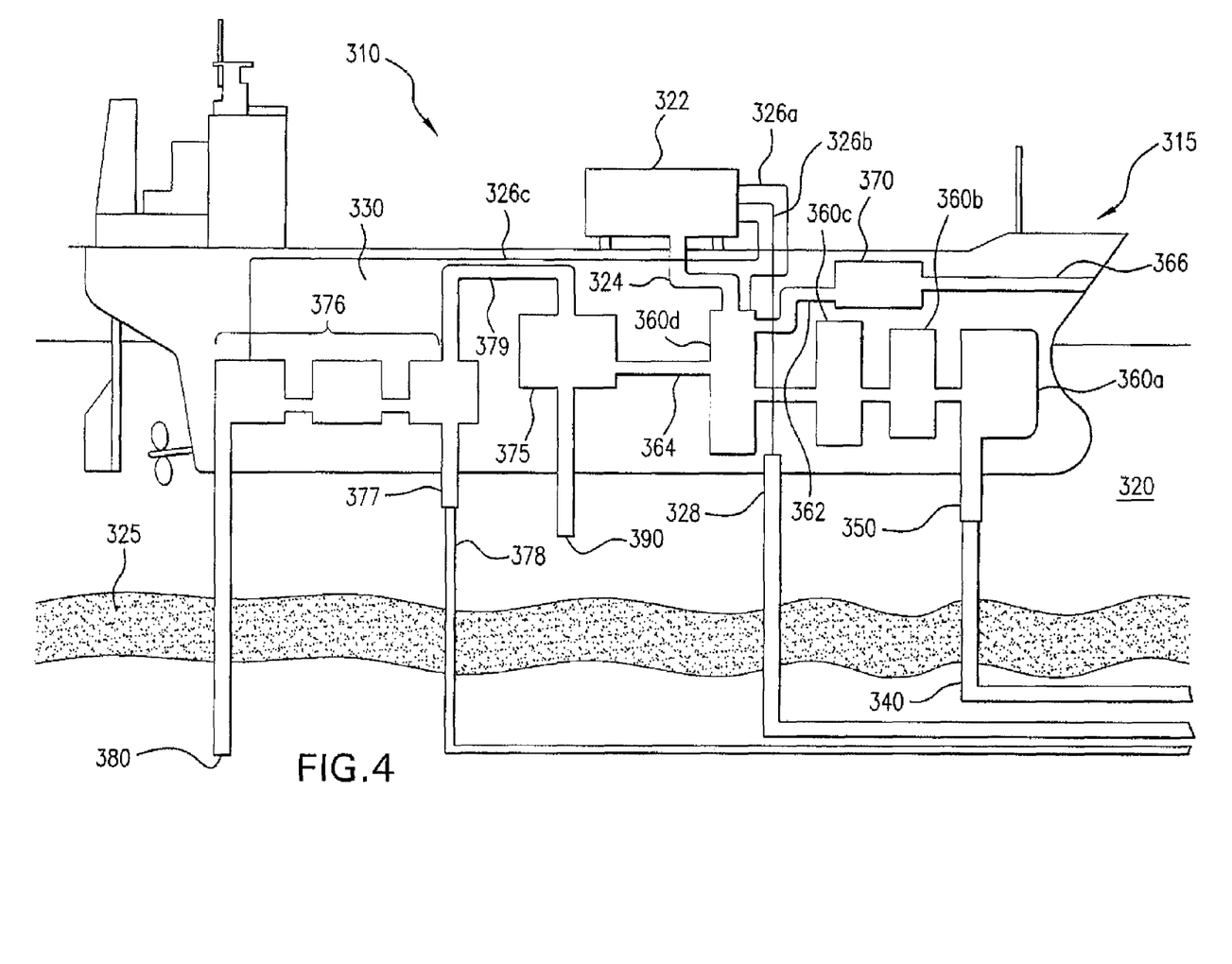
FIG. 4 is a side view of an apparatus for treating WW and desalinating SW, the apparatus including an energy producing means for converting combustible gases into electricity.

Referring now to FIG. 4, a sea-going vessel 315 includes a WW treatment system in combination with a desalination system and a power generation system capable of transferring power off the vessel 315. Similar to the embodiment of FIG. 3, the WW treatment system includes a wastewater intake port 350 for intaking WW onto the vessel 315 from a WW pipeline 340; WW treatment components 360a, 360b, 360c, and 360d; a treated WW conduit 364 for transporting treated WW away from the WW treatment components 360a, 360b, 360c, and 360d; a sludge treatment component 370; and a sludge transfer conduit 366. Likewise, the desalination system of the vessel 315 includes a SW intake 380, a desalination component 376, a desalinated water discharge port 377; and a concentrate conduit 379. Both the WW treatment system and the desalination system are in fluid communication with a concentrate-treated WW mixing system that includes a mixing tank 375 and a discharge port 390.

In addition to WW treatment and desalination, the vessel 315 further includes a power producing means 322 shown in FIG. 4 as an electrical generator disposed on the deck of the vessel 315. The power generation system further includes a combustible gas conduit 324 connecting the WW treatment component 360d with the power producing means 322 such that combustible gases (e.g., methane) generated in the WW treatment process can be used as fuel by the power producing means 322. The power produced by the means 322 can be used to operate one or more functions of the vessel 315 such as propulsion devices, control systems, desalination components, and WW treatment components. This power might also be transferred to a land-based site, such as an electricity distribution center for use or distribution. The transfer of energy can be accomplished by any suitable means known in the art for transferring energy from a vessel to a land-based site. In the embodiment shown in FIG. 4, electrical power generated onboard the vessel 315 is transferred to one or more of the WW treatment components 360a-360d via an electrically conductive cable 326a, to the desalination system 376 via an electrically conductive cable 326c, and to an electricity transfer means 328 (e.g., an electrically conductive cable) via electrically conductive cable 326b. Through the electricity transfer means 328 (e.g., electrically conductive cable), the energy can be transferred to a land-based site.

Example 5

Figure 5:
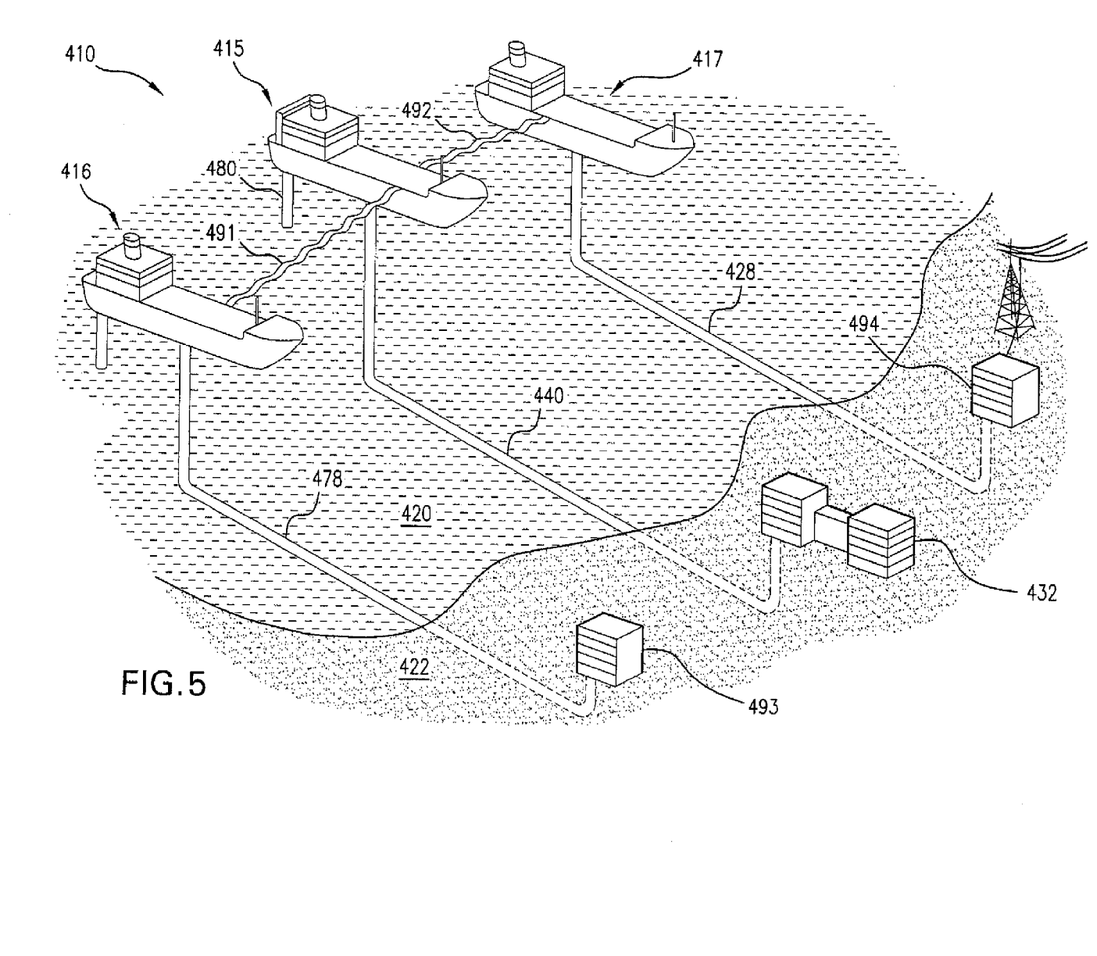
FIG. 5 is schematic view of three apparatuses of a system fluidly connected to one another.

Referring now to FIG. 5, a system for treating WW 410 includes three different sea-going vessels (WW treatment vessel 415, desalination vessel 416, and power generation vessel 417) in fluid and/or electrical communication with one another and positioned on a body of SW 20 via connecting means 491 and 492; a WW intake pipeline 440 fluidly connecting the vessel 415 with a land-based sewer facility 432; a desalinated water pipeline 478 fluidly connecting the vessel 416 with a land-based desalinated water distribution facility 493; and an electricity transfer means 428 (e.g., a cable) electrically connecting the vessel 417 with a land-based electricity distribution center 494.

In operation, WW treatment is performed on vessel 415, desalination of SW is performed on vessel 416, and power generation is performed on vessel 417. Vessel 415 receives WW to be treated from the land-based sewage collection facility 432 via the treated WW pipeline 440. Sludge produced in the WW process is returned to land or discharged into the body of SW 20 (e.g., after dilution). Vessel 416 desalinates SW taken up from the body of SW 20. The desalinated water is transferred to the land-based desalinated water distribution facility 493 via the desalinated water pipeline 478. The concentrate resulting from the desalination process is transferred to vessel 415 via the connecting means 491, where it is mixed with treated WW to produce a concentrate-treated WW mixture that is discharged into the body of SW 20. Alternatively, treated WW generated on vessel 415 can be transferred via apparatus connecting means 491 to vessel 416, where it can be mixed with the concentrate prior to discharge into the body of SW 20.

The power producing vessel 417 includes a power producing means and is arranged to receive combustible gases that result from the WW treatment process on vessel 415 via the apparatus connecting means 492. The energy generated on vessel 417 can be used to power systems (e.g., propulsion, desalination systems, or WW treatment systems) on one or more of the vessels. Power generated on vessel 417 can be transferred to vessel 415 and 416 by any suitable means. As an example, the apparatus connecting means 491 and 492 can include an electrically conductive cable for transferring electrical power from the vessel 417 to the other vessels 415 and 416. In FIG. 5, at least a portion of the electricity generated on vessel 417 is transferred to a land-based electricity distribution center 494 by an electricity transfer means 428 (e.g., a seabed cable disposed on top of or under the sea floor).

OTHER EMBODIMENTS

While the above specification contains many specifics, these should not be construed as limitations on the scope of the invention, but rather as examples of preferred embodiments thereof. Accordingly, the scope of the invention should be determined not by the embodiments illustrated, but by the appended claims and their legal equivalents.

What is claimed is:

1. A vessel configured to float on a body of seawater, comprising:
    a wastewater treatment system comprising:
        a wastewater intake port for intaking wastewater onto the vessel;
        a wastewater treatment component for treating the wastewater to produce treated wastewater and sludge; and
        a treated wastewater conduit for transporting the treated wastewater away from the wastewater treatment component;
    a desalination system comprising:
        a seawater intake for intaking seawater from the body of seawater onto the vessel;

a desalination component for desalinating the seawater to produce concentrate and desalinated water; and
a desalinated water discharge port for transferring the desalinated water from the vessel,
a mixing system comprising:
a mixing tank for mixing the treated wastewater from the wastewater treatment system with the concentrate from the desalination system, and
a wastewater discharge system for discharging the treated wastewater and concentrate mixture into the body of seawater.

2. The vessel of claim 1, further comprising a sludge treatment component for treating the sludge, and a sludge transferring means for transferring the sludge from the vessel.

3. The vessel of claim 1, wherein the mixing tank is configured to receive seawater from the seawater intake such that the treated wastewater and concentrate mixture is diluted with the seawater before being discharged into the body of seawater.

4. The vessel of claim 1, wherein the wastewater discharge system comprises a member extending down from the vessel with a plurality of discharge ports disposed on the member.

5. The vessel of claim 1, further comprising a power generation system for producing electricity to run the wastewater treatment system, wherein the power generation system comprises an electricity transfer cable for transferring at least some of the electricity generated by the power generation system is delivered to land.

6. The vessel of claim 1, further comprising a power generation system for producing electricity to run the desalination system, wherein the power generation system comprises an electricity transfer cable for transferring at least some of the electricity generated by the power generation system to land.

7. A first vessel and a second vessel configured to float on a body of seawater, wherein
the first vessel comprises a wastewater treatment system comprising:
a wastewater intake port for intaking wastewater onto the first vessel;
a wastewater treatment component for treating the wastewater to produce treated wastewater and sludge; and
a treated wastewater conduit for transporting the treated wastewater away from the wastewater treatment component;
the second vessel comprises a desalination system comprising:
a seawater intake for intaking seawater from the body of seawater onto the second vessel;
a desalination component for desalinating the seawater to produce concentrate and desalinated water; and
a desalinated water discharge port for transferring the desalinated water from the second vessel,
at least one of the first vessel and the second vessel comprises a mixing system comprising:
a mixing tank for mixing treated wastewater from the wastewater treatment system with concentrate from the desalination system, and
at least one of the first vessel and the second vessel comprises a wastewater discharge port for discharging the treated wastewater and concentrate mixture into the body of seawater.

8. The first and second vessels of claim 7, wherein the first vessel further comprises a sludge treatment component for treating the sludge, and a sludge transferring means for transferring the sludge from the first vessel.

9. The first and second vessels of claim 7, wherein the mixing tank is configured to receive seawater from the seawater intake such that the treated wastewater and concentrate mixture is diluted with the seawater before being discharged into the body of seawater.

10. The first and second vessels of claim 7, wherein the wastewater discharge system comprises a member extending down from the vessel with a plurality of discharge ports disposed on the member.

11. The first and second vessels of claim 7, wherein the first vessel further comprises a power generation system for producing electricity to run the wastewater treatment system, wherein the power generation system comprises an electricity transfer cable for transferring at least some of the electricity generated by the power generation system is delivered to land.

12. The first and second vessels of claim 7, wherein the second vessel further comprises a power generation system for producing electricity to run the desalination system, wherein the power generation system comprises an electricity transfer cable for transferring at least some of the electricity generated by the power generation system to land.

* * * * *